United States Patent
Lu et al.

(10) Patent No.: US 11,410,001 B2
(45) Date of Patent: Aug. 9, 2022

(54) METHOD AND APPARATUS FOR OBJECT AUTHENTICATION USING IMAGES, ELECTRONIC DEVICE, AND STORAGE MEDIUM

(71) Applicant: SHANGHAI SENSETIME INTELLIGENT TECHNOLOGY CO., LTD., Shanghai (CN)

(72) Inventors: Yi Lu, Shanghai (CN); Li Cao, Shanghai (CN); Chunlei Hong, Shanghai (CN)

(73) Assignee: SHANGHAI SENSETIME INTELLIGENT TECHNOLOGY CO., LTD, Shanghai (CN)

( * ) Notice: Subject to any disclaimer, the term of this patent is extended or adjusted under 35 U.S.C. 154(b) by 40 days.

(21) Appl. No.: 17/015,189

(22) Filed: Sep. 9, 2020

(65) Prior Publication Data

US 2020/0401857 A1 Dec. 24, 2020

Related U.S. Application Data

(63) Continuation of application No. PCT/CN2019/093388, filed on Jun. 27, 2019.

(30) Foreign Application Priority Data

Dec. 21, 2018 (CN) .......................... 201811574840.3

(51) Int. Cl.
*G06K 9/62* (2022.01)
*H04N 5/247* (2006.01)
(Continued)

(52) U.S. Cl.
CPC ........... *G06K 9/6288* (2013.01); *G06K 9/622* (2013.01); *G06K 9/6215* (2013.01);
(Continued)

(58) Field of Classification Search
CPC ............. G06K 9/6288; G06K 9/00295; G06K 9/00926; G06K 9/6202; G06K 9/622;
(Continued)

(56) References Cited

U.S. PATENT DOCUMENTS

| 6,111,517 A | 8/2000 | Atick |
| 2002/0136433 A1* | 9/2002 | Lin .................... G06K 9/00295 382/118 |

(Continued)

FOREIGN PATENT DOCUMENTS

| CN | 102609729 A | 7/2012 |
| CN | 103530652 A | 1/2014 |

(Continued)

OTHER PUBLICATIONS

Wong et al, Patch-based Probabilistic Image Quality Assessment for Face Selection and Improved Video-based Face Recognition (published in CVPR 2011 Workshops, pp. 74-81, Jun. 2011) (Year: 2011).*

(Continued)

*Primary Examiner* — Casey L Kretzer
(74) *Attorney, Agent, or Firm* — Cooper Legal Group, LLC

(57) ABSTRACT

An image processing method and apparatus, and a storage medium are provided. The method includes: obtaining a first image and a second image of a to-be-authenticated object, where the first image is captured by a first camera module, and the second image is captured by at least one second camera module; comparing the first image with image data in a target library for identity authentication, to obtain a first authentication result; and in response to that the first authentication result is authentication failure, performing joint authentication on the first image and the second image, and determining the identity of the to-be-authenticated object (Continued)

FIG. 5 according to a second authentication result of the joint authentication.

20 Claims, 7 Drawing Sheets

(51) Int. Cl.
    *G06V 10/75*     (2022.01)
    *G06V 40/50*     (2022.01)
    *G06V 40/16*     (2022.01)

(52) U.S. Cl.
    CPC .......... *G06V 10/751* (2022.01); *G06V 40/173* (2022.01); *G06V 40/50* (2022.01); *H04N 5/247* (2013.01)

(58) Field of Classification Search
    CPC ......... G06K 9/6201–6215; G06K 9/03; G06K 2209/23; G06K 2209/19; G06T 7/0004–001; H04N 5/247; G06V 10/751; G06V 40/173; G06V 40/50
    See application file for complete search history.

(56) References Cited

U.S. PATENT DOCUMENTS

| | | | | |
|---|---|---|---|---|
| 2008/0080748 | A1* | 4/2008 | Sukegawa | G06K 9/00885 382/118 |
| 2014/0161316 | A1* | 6/2014 | Golan | G06K 9/00261 382/103 |
| 2016/0092724 | A1* | 3/2016 | Jeong | H04N 5/23218 348/77 |
| 2016/0364609 | A1* | 12/2016 | Ivanisov | G06K 9/4604 |
| 2019/0266427 | A1* | 8/2019 | Chang | G06F 21/32 |
| 2019/0272415 | A1* | 9/2019 | Miao | G06F 16/1748 |

FOREIGN PATENT DOCUMENTS

| | | |
|---|---|---|
| CN | 105023005 A | 11/2015 |
| CN | 105426485 A | 3/2016 |
| CN | 205080692 U | 3/2016 |
| CN | 105809096 A | 7/2016 |
| CN | 105956520 A | 9/2016 |
| CN | 106228188 A | 12/2016 |
| CN | 106250821 A | 12/2016 |
| CN | 106778470 A | 5/2017 |
| CN | 107305624 A | 10/2017 |
| CN | 206541317 U | 10/2017 |
| CN | 107480658 A | 12/2017 |
| CN | 107729815 A | 2/2018 |
| CN | 107729928 A | 2/2018 |
| CN | 108229297 A | 6/2018 |
| CN | 108446681 A | 8/2018 |
| CN | 108875522 A | 11/2018 |
| CN | 109658572 A | 4/2019 |
| JP | 2009294955 A | 12/2009 |
| JP | 2018018324 A | 2/2018 |
| JP | 2018022452 A | 2/2018 |
| JP | 2018063551 A | 4/2018 |
| KR | 20130133676 A | 12/2013 |
| WO | 2010005215 A2 | 1/2010 |

OTHER PUBLICATIONS

International Search Report in the international application No. PCT/CN2019/093388, dated Oct. 8, 2019, 2 pgs.
First Office Action of the Chinese application No. 201811574840.3, dated Nov. 26, 2019, 21 pgs.
Second Office Action of the Chinese application No. 201811574840. 3, dated Apr. 21, 2020, 11 pgs.
First Office Action of the Korean application No. 10-2020-7026016, dated Feb. 25, 2022, 15 pgs.
First Office Action of the Japanese application No. 2020-547077, dated Nov. 30, 2021, 14 pgs.
English translation of the Written Opinion of the International Search Authority in the international application No. PCT/CN2019/093388, dated Oct. 8, 2019, 7 pgs.

* cited by examiner

METHOD AND APPARATUS FOR OBJECT AUTHENTICATION USING IMAGES, ELECTRONIC DEVICE, AND STORAGE MEDIUM

CROSS REFERENCE TO RELATED APPLICATIONS

The present application is a continuation of International Patent Application No. PCT/CN2019/093388, filed on Jun. 27, 2019, which claims priority to Chinese Patent Application No. 201811574840.3, filed on Dec. 21, 2018. The disclosures of International Patent Application No. PCT/CN2019/093388 and Chinese Patent Application No. 201811574840.3 are hereby incorporated by reference in their entireties.

BACKGROUND

At present, places such as government buildings, enterprise parks, hotels, residence communities, and office buildings generally adopt conventional civil defense methods to manage personnel entering the corresponding places. However, this method cannot recognize whether the visiting personnel have access to the area. Based on this problem, a gate or an access control is generally used for swiping cards, or management is performed by means of face recognition. However, the gate or card swiping method cannot prevent private card replacement or follow-up behavior. In addition, stranger recognition based on face recognition causes large differences between the captured photos of the personnel and photos in the target library, because face occlusion, side face, bowed head, etc. often appear when the personnel appears in front of the camera in actual scenes, which causes high false alarm rate of strangers.

SUMMARY

The present disclosure relates to the field of intelligent monitoring. Embodiments of the present disclosure provide an image processing method and apparatus, an electronic device, and a storage medium capable of jointly determining the identities of to-be-authenticated objects in corresponding areas and places by means of image information captured by multiple camera modules, the determination accuracy is high, and the false alarm rate is low.

According to one aspect of the present disclosure, provided is an image processing method, including: obtaining a first image and a second image of a to-be-authenticated object, where the first image is captured by a first camera module, and the second image is captured by at least one second camera module; comparing the first image with image data in a target library for identity authentication, to obtain a first authentication result; and in response to that the first authentication result is authentication failure, performing joint authentication on the first image and the second image, and determining the identity of the to-be-authenticated object according to a second authentication result of the joint authentication.

According to a second aspect of the present disclosure, provided is an image processing apparatus, including: an obtaining module, configured to obtain a first image and a second image of a to-be-authenticated object, where the first image is captured by a first camera module, and the second image is captured by at least one second camera module; a first authentication module, configured to compare the first image with image data in a target library for identity authentication, to obtain a first authentication result; and a second authentication module, configured to perform, in response to the case that the first authentication result is authentication failure, joint authentication on the first image and the second image, and determine the identity of the to-be-authenticated object according to a second authentication result of the joint authentication.

According to a third aspect of the present disclosure, provided is an electronic device, including:
a processor; and a memory configured to store processor-executable instructions; where the processor is configured to execute the method according to any one of the items in the first aspect.

According to a fourth aspect of the present disclosure, provided is a computer-readable storage medium, having computer program instructions stored thereon, where the computer program instructions, when being executed by a processor, enable the processor to implement the method according to any one of the items in the first aspect.

It should be understood that the above general description and the following detailed description are merely exemplary and explanatory, and are not intended to limit the present disclosure. The other features and aspects of the present disclosure can be described more clearly according to the detailed descriptions of the exemplary embodiments in the accompanying drawings.

BRIEF DESCRIPTION OF THE DRAWINGS

The accompanying drawings here incorporated in the specification and constituting a part of the specification illustrate the embodiments consistent with the present disclosure and are intended to explain the technical solutions of the present disclosure together with the specification.

DETAILED DESCRIPTION

The various exemplary embodiments, features, and aspects of the present disclosure are described below in detail with reference to the accompanying drawings. The same signs in the accompanying drawings represent elements having the same or similar functions. Although the various aspects of the embodiments are illustrated in the accompanying drawings, unless stated particularly, it is not required to draw the accompanying drawings in proportion.

The special word "exemplary" here means "used as examples, embodiments, or descriptions". Any "exemplary" embodiment given here is not necessarily construed as being superior to or better than other embodiments.

The term "and/or" as used herein merely describes an association relationship between associated objects, indicating that there may be three relationships, for example, A and/or B, which may indicate that A exists separately, both A and B exist, and B exists separately. In addition, the term "at least one" as used herein means any one of multiple elements or any combination of at least two of the multiple elements, for example, including at least one of A, B, or C, which indicates that any one or more elements selected from a set consisting of A, B, and C are included.

In addition, numerous details are given in the following detailed description for the purpose of better explaining the present disclosure. A person skilled in the art should understand that the present disclosure may also be implemented without some specific details. In some examples, methods, means, elements, and circuits well known to a person skilled in the art are not described in detail so as to highlight the subject matter of the present disclosure.

Figure 1:
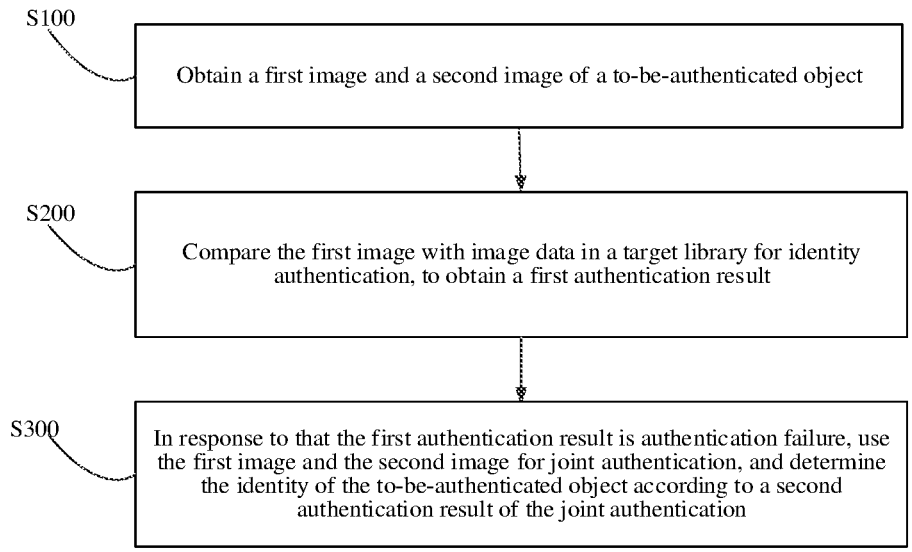
FIG. 1 is a flowchart illustrating an image processing method according to embodiments of the present disclosure.

FIG. 1 is a flowchart illustrating an image processing method according to embodiments of the present disclosure. The image processing method of the embodiments of the present disclosure can be applied to places that need to manage entry personnel, such as government buildings, enterprise parks, hotels, residence communities, and office buildings, and performs joint discrimination on the identity of the to-be-authenticated object according to image information captured by camera modules located in different areas, so as to determine whether the to-be-authenticated object is a stranger or a registered person in the library.

As shown in FIG. 1, the image processing method according to the embodiments of the present disclosure includes the following steps.

At S100, a first image and a second image of a to-be-authenticated object are obtained, where the first image is captured by a first camera module, and the second image is captured by at least one second camera module.

The image processing method according to the embodiments of the present disclosure is applied to electronic devices having an image processing function, such as a terminal device or a server. The terminal device may be a mobile phone, a computer device, or the like. These electronic devices are electrically connected to camera devices installed at different corners of the to-be-detected area. The camera devices include, but are not limited to, cameras, snapshot machines, and the like. In other embodiments, these electronic devices include a display screen.

The to-be-authenticated object refers to a person who enters the to-be-authenticated area. The first image and the second image are a facial image of the to-be-authenticated object whose identity needs to be determined, or a body image. In the embodiments of the present disclosure, explanation is made with the facial image, but should not be construed as limiting the present disclosure. The first image and the second image here are from different video sources. For example, the first image is captured by the first camera module, and the second image is captured by at least one second camera module. The embodiments of the present disclosure may be implemented by providing different camera modules in different position areas, that is, the first camera module and the second camera module may be camera modules provided in different positions. Moreover, for the sake of description, camera modules other than the first camera module are collectively referred to as the second camera module, and the positions of the second camera modules can also be different. In this way, image information in different position areas is captured in real time. In addition, the capture time of the first image and the second image may be the same or different, which is not limited in the present disclosure.

At S200, the first image is compared with image data in a target library for identity authentication, to obtain a first authentication result.

The first feature data of each first image is obtained by using a neural network, and the first feature data is compared with the feature data of the image data in a pre-stored target library, and the target library includes registered blacklists and whitelists, and objects that are annotated as strangers. By performing comparative matching on the first feature data and the feature data in the target library, it is convenient to determine whether the object corresponding to the first feature data is a personnel object in the target library. If no feature data matching the first feature data exists in the target library, it is indicated that the first authentication result for the first image is authentication failure. If feature data matching the first feature data exists in the target library, it is indicated that the first authentication result for the first image is authentication success.

At S300, in response to the case that the first authentication result is authentication failure, the first image and the second image are used for joint authentication, and the identity of the to-be-authenticated object is determined according to a second authentication result of the joint authentication.

Based on the identity authentication in step S200, if no feature data matching the first feature data exists in the target library, the identity of the to-be-authenticated object is authenticated by combining the second image captured by at least one second camera module for joint authentication.

In the embodiments of the present disclosure, joint authentication is performed on the identity of the to-be-authenticated object for the first image and the second image that fail in authentication, thereby improving the authentication success rate of the to-be-authenticated object.

The specific process of the embodiments of the present disclosure is described in detail below. When the embodiments of the present disclosure are executed, first, the first image and the second image of the to-be-authenticated object are obtained in step S100, and the first image is obtained by means of the image captured by the first camera module. As described above, the image processing method according to the embodiments of the present disclosure may be applied to places that need to manage personnel. Cameras are installed at different positions of the place, and any one of the cameras may be used as the first camera module in the embodiments of the present disclosure. For the sake of description, camera modules other than the first camera module hereinafter are referred to as second camera modules, and images captured by the second camera module may be referred to as second images.

Figure 2:
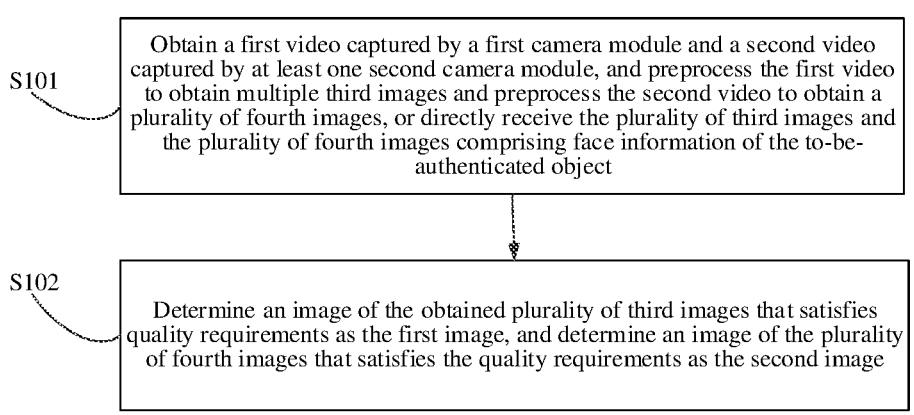
FIG. 2 is a flowchart illustrating step S100 in an image processing method according to embodiments of the present disclosure.

The first image and the second image that need to be authenticated obtained in step S100 in the embodiments of the present disclosure are images obtained directly from the first camera module and the second camera module, or are images obtained after analysis and filtering. The present disclosure does not limit the above conditions. FIG. 2 is a flowchart illustrating step S100 in an image processing method according to embodiments of the present disclosure. Obtaining the first image to be subjected to identity determination includes the following steps.

At S101, a first video captured by a first camera module and a second video captured by at least one second camera module are obtained, and the first video is preprocessed to obtain multiple third images and the second video is preprocessed to obtain a fourth image, or the third images and the fourth image including facial information of the to-be-authenticated object are directly received.

In the embodiments of the present disclosure, the received information may be information in a video form or information in a picture form. When the information in a video form is received, a preprocessing operation is performed on the video information to obtain the third image and the fourth image the need to be processed from the video information, where the preprocessing operation includes processing operations such as video decoding, image sampling, and face detection. By means of the foregoing preprocessing operation, the corresponding third image and the fourth image including the facial image may be obtained.

In some other possible embodiments, the third image and the fourth image obtained in a picture form is obtained. In this case, the third image and the fourth image are directly processed. That is, the third and fourth images of the facial image of the to-be-authenticated object are obtained in a face detection mode. Alternatively, the first camera module directly captures the third image including the facial image, and the second camera module directly captures the fourth image including the facial image. For example, the first camera module and the second camera module may be face snapshot machines. The obtained third image and the fourth image are facial images, which is not specifically limited in the present disclosure, as long as the obtained third image and the fourth image include the to-be-determined facial area of the to-be-authenticated object, it can serve as the embodiment of the present disclosure.

At S102, an image that satisfies quality requirements in the obtained third image is determined as the first image, and an image that satisfies the quality requirements in the fourth image is determined as the second image.

In the actual scene, the angle and resolution of the captured image, whether wearing accessories such as hats, masks, and eyeglasses, and the obscuration of other objects or people are all random. Therefore, after the third image and the fourth image captured by the camera modules are obtained, it is necessary to screen images that meet the quality requirements from the third image and the fourth image to perform identity detection and determination of the user. The angle and quality score of the third image and the fourth image are jointly determined simultaneously, and pictures lower than a certain quality may be discarded.

In the embodiments of the present disclosure, the image quality of the third image and the fourth image is determined by means of the neural network, or the image quality of the third image is also determined by means of a preset algorithm. The third image and the fourth image are scored by combining the image resolution and the face angle. If the score value is lower than a preset score value, such as less than 80 points, the third image and the fourth image are deleted. If the score value is higher than the preset score value, it is indicated that the quality of the image satisfies the quality requirements. In this case, the third image and the fourth image are used to perform the determination of the identity of the personnel, that is, the third image that satisfies the quality requirements is used as the to-be-authenticated first image, and the fourth image that satisfies the quality requirements is used as the to-be-authenticated second image. The preset scores are set voluntarily according to different needs and application scenarios, which is not specifically limited in the present disclosure.

In some other possible implementations, after obtaining the first image and the second image of the to-be-authenticated object, and before obtaining the first feature data of the first image, and comparing the first feature data with the feature data in the target library for identity authentication to obtain the first authentication result, the method further includes: detecting whether the first image and/or the second image includes a predetermined feature, and when it is detected that the third image and/or the fourth image includes the predetermined feature, annotating the third image and/or the second image including the predetermined feature. The annotation here means that an identifier may be assigned to the third image and/or the fourth image including the predetermined feature. The identifier is used to indicate that the corresponding image may be directly used as the to-be-authenticated first image and second image. The predetermined feature may include at least one of a mask, a hat, or sunglasses. For example, when it is detected that the to-be-authenticated object in the third image obtained from the first video captured by the first camera module is the to-be-authenticated object wearing a hat and a mask (that is, the feature data corresponding to the first image includes a hat, a mask, and other features), the to-be-authenticated object is directly included in the suspicious person, that is, the third image is used as the first image. Alternatively, when it is determined that the to-be-authenticated object in the fourth image obtained from the second video captured by the second camera module is a to-be-authenticated object wearing a hat and sunglasses (that is, the feature data corresponding to the second image includes a hat, sunglasses, and other features), the to-be-authenticated object is directly included in the suspicious person, that is, the fourth image is used as the second image. The third image and the fourth image are detected by means of the neural network to determine whether the feature has the predetermined feature.

In the foregoing manner, the to-be-processed first image and second image are conveniently obtained for receiving different types of images, and since the obtained first and second images are images that satisfy the quality requirements, the first and second images may be used for accurate authentication of the to-be-authenticated object.

After the first image and the second image are obtained, comparative matching is performed on the first and second images and the feature data of the object in the target library, that is, step S200 may be performed. The embodiments of the present disclosure may include a target library, where blacklists and whitelists, as well as the information of annotated strangers are recorded in the target library. The blacklist refers to information of objects that cannot enter the place, and the whitelist refers to information of objects that are allowed to enter the place. The target library in the embodiments of the present disclosure stores information of objects with known identities and information of objects that are annotated as strangers.

For example, for the first image obtained by the first camera module, after the first image is obtained in step S100, the embodiments of the present disclosure may perform comparative matching on the first feature data of the first image and the feature data of the image data in the target library. For example, the target library stores the facial image of each first object and facial feature data thereof, or may also include other information, such as name, age, etc., which is not specifically limited in the present disclosure.

In the embodiments of the present disclosure, the first feature data of the first image is compared with the feature data of each object in the target library. If feature data whose matching value with the first feature data exceeds a first matching threshold exists in the target library, it can be determined that the to-be-authenticated object corresponding to the first image is an object in the target library, which indicates that the first authentication result is authentication success. Further, if the feature data corresponding to the first feature data cannot be queried, it can be determined that the first authentication result is authentication failure. In addition, when no feature data matching the first feature data of the first image exists in the target library, for example, if the matching values of the facial features of all the objects in the target library and the first feature data are lower than the first matching threshold, it can be determined that no feature data matching the first feature data exists in the target library. That is, the to-be-authenticated object corresponding to the first image is not a person in the target library. In this case, a further determination is made by combining the second image captured by the second camera module. The embodiments of the present disclosure performs the identity authentication of the character object based on the image captured by the camera module or the received image, which may achieve the effect of comparing the input image with the image data in the target library, i.e., the effect of searching by images, an image in the target library that matches the input image may be found.

It should be noted here that the target library in the embodiments of the present disclosure may include a whitelist/blacklist library and an annotated stranger library. The whitelist/blacklist library includes registered blacklist objects and whitelist objects, where the blacklist objects are persons who are restricted from entering the corresponding place, and the whitelist objects are persons who are permitted to enter the corresponding place. The whitelist/blacklist library includes facial images of the whitelist object and the blacklist object, or may also include corresponding names, ages, jobs and other information. The identity authentication of the to-be-authenticated object is performed for the whitelist/blacklist library, and the authentication result may indicate whether the to-be-authenticated object is a blacklist object or a whitelist object.

Figure 3:
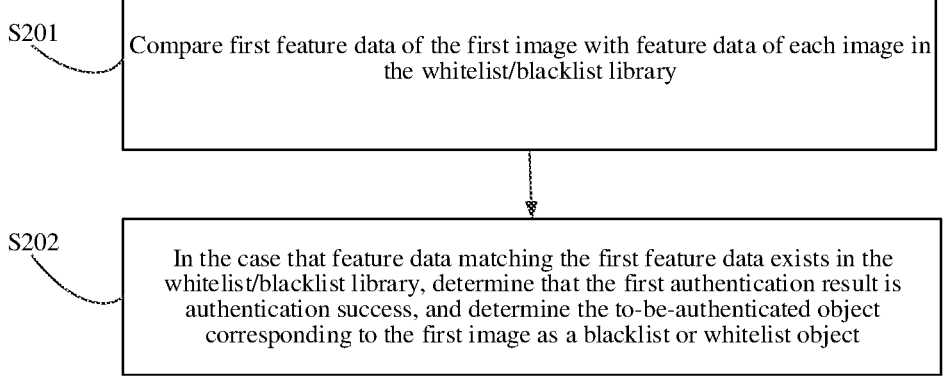
FIG. 3 is a flowchart illustrating step S200 in an image processing method according to embodiments of the present disclosure.

FIG. 3 is a flowchart illustrating step S200 in an image processing method according to embodiments of the present disclosure. Comparing the first image with image data in the target library for identity authentication, to obtain the first authentication result includes the following steps.

At S201, first feature data of the first image is compared with feature data of each image in the whitelist/blacklist library.

At step S202, in the case that feature data matching the first feature data exists in the whitelist/blacklist library, it is determined that the first authentication result is authentication success, and the to-be-authenticated object corresponding to the first image is determined as a blacklist or whitelist object.

As described above, the target library includes a whitelist/blacklist library. The whitelist/blacklist library may include the facial images of the whitelist object and the blacklist object, or may also directly include the feature data of the facial image. By matching the first feature data with the feature data in the image data of each object in the whitelist/blacklist library, if there is feature data with the matching degree to the first feature data higher than a first matching threshold, it can be determined that the to-be-authenticated object is an object in the whitelist/blacklist library, and the identity information corresponding to the feature data with the highest matching degree is determined as the identity information of the to-be-authenticated object. In this case, the identity of the to-be-authenticated object may be confirmed, and it is indicated that the first authentication result is authentication success. Otherwise, if the matching degrees of all the feature data in the whitelist/blacklist library and the first feature data are less than the first matching threshold, it is indicated that no object matching the to-be-authenticated object exists in the whitelist/blacklist library.

In some possible implementations, after querying the feature data matching the first feature data in the whitelist/blacklist library, the first image and the associated information thereof may be loaded into the matching record of the matched object, where the associated information may be the time when the first camera module captures the first image, an identifier of the first camera module, and corresponding position information, etc. In the embodiments of the present disclosure, when each image is obtained, the associated information of each image is obtained at the same time. By adding the successfully authenticated first image and the associated information thereof to the corresponding matching record, it is convenient to analyze the object's trajectory, travel time, and so on.

In other embodiments, if it is queried in the whitelist/blacklist library that the object corresponding to the feature data matching the first feature is the blacklist object, a preset prompt operation may also be performed in this case, for example, the entry of the blacklist person may be prompted by voice or display output. Alternatively, it is also possible to collect statistics about information such as the number of entries of the blacklist object, and prompt to output the number of entries at the same time, which is convenient for managers to check. In the embodiments of the present disclosure, the foregoing information is transmitted to the user interaction interface of the electronic device, and displayed by means of the user interaction interface, so as to conveniently view different pieces of prompt information.

According to the foregoing method, the identity authentication of the blacklist object and the whitelist object is performed, and if the feature data matching the first feature data exists in the whitelist/blacklist library, it is determined that the first authentication result is authentication success.

In addition, as described above, the target library may also include an annotated stranger library. The objects in the annotated stranger library are objects annotated as strangers, where the annotated stranger library also includes facial images of each object or directly includes facial feature data, and may also include associated information such as the capture time and position of each facial image, and may also include the number of times that the objects are annotated as strangers.

For the annotated stranger library, the identity authentication of the to-be-authenticated object may be performed, and the authentication result may indicate whether the to-be-authenticated object is an annotated stranger object.

Figure 4:
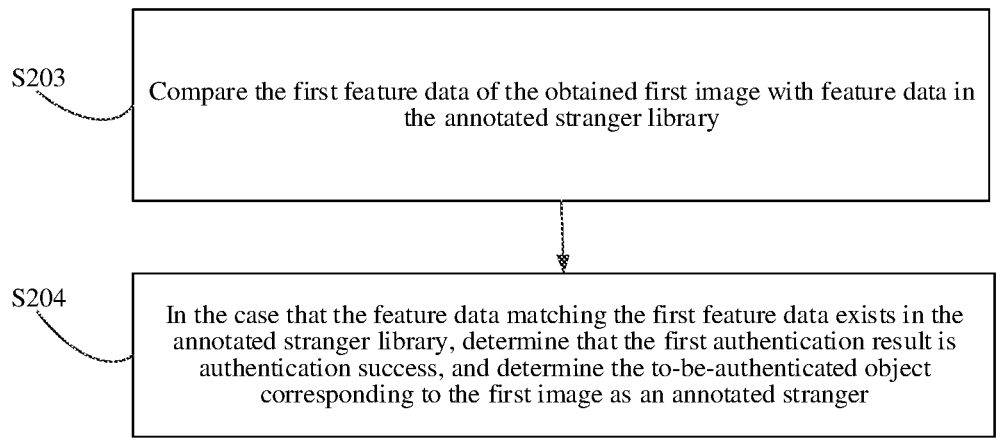
FIG. 4 is a flowchart illustrating step S200 in an image processing method according to embodiments of the present disclosure.

FIG. 4 is a flowchart illustrating step S200 in an image processing method according to embodiments of the present disclosure. Comparing the first image with image data in the target library for identity authentication, to obtain the first authentication result includes the following steps.

At S203, the first feature data of the obtained first image is compared with feature data of an image in the annotated stranger library.

At S204, in the case that the feature data matching the first feature data exists in the annotated stranger library, it is determined that the first authentication result is authentication success, and the to-be-authenticated object corresponding to the first image is determined as an annotated stranger.

As described above, the target library includes an annotated stranger library. The annotated stranger library may directly include a facial image of an object annotated as a stranger, or may also directly include feature data of the facial image. By matching the first feature data with the feature data of each object in the annotated stranger library, if there is feature data with the matching degree to the first feature data higher than a second matching threshold, it can be determined that the to-be-authenticated object is an object in the annotated stranger library, and the identity information of the object corresponding to the feature data with the highest matching degree can be determined as the identity information of the authentication object. In this case, the identity of the to-be-authenticated object is confirmed as a stranger, and it is indicated that the first authentication result is authentication success. Otherwise, if the matching degrees of all the feature data and the first feature data are lower than the second matching threshold, it is indicated that no object matching the to-be-authenticated object exists in the annotated stranger library.

In some possible implementations, after querying the feature data matching the first feature data in the annotated stranger library, the first image and the associated information thereof may be loaded into the matching record of the matched object, where the associated information may be the time when the first camera module captures the first image, an identifier of the first camera module, and corresponding position information, etc. In the embodiments of the present disclosure, when each image is obtained, the associated information of each image is obtained at the same time. By adding the successfully authenticated first image and the associated information thereof to the corresponding matching record, it is convenient to analyze the object's trajectory, travel time, and so on.

In other embodiments, if the feature data matching the first feature is queried in the annotated stranger library, a preset prompt operation may also be performed in this case. For example, the entry of the stranger is prompted by means of voice or display output. Alternatively, information such as the number of times that the stranger is annotated in the corresponding place, the staying time of the stranger in the corresponding place, and the frequency of occurrence is counted, and the foregoing information is prompted to be output for the convenience of the manager to check. The staying time is determined based on the time when it is detected that the object is annotated as a stranger. For example, the time difference between the first time when the object is annotated as a stranger the last time and the time when the object is annotated as a stranger the first time is used as the staying time, and the frequency of occurrence may be a ratio of the number of times the stranger is recognized to the foregoing staying time. In other embodiments of the present disclosure, other information may also be counted, such as the position information of the stranger.

The position of the stranger may be determined according to the identifier or position of the camera module that captures the image of the stranger, so that the moving trajectory of the stranger may be obtained, and the present disclosure does not list the statistical information one by one. In the embodiments of the present disclosure, the foregoing information is transmitted to the user interaction interface of the electronic device, and displayed by means of the user interaction interface, so as to conveniently view different pieces of prompt information.

According to the foregoing method, the identity authentication of the stranger object that is ranked is performed, and if the feature data matching the first feature data exists in the annotated stranger library, it is determined that the first authentication result is authentication success.

The first matching threshold and the second matching threshold may be the same threshold or different thresholds, and a person skilled in the art may set the value according to requirements.

In addition, in the embodiments of the present disclosure, for the authentication order of the whitelist/blacklist library and the annotated stranger library in the target library, a person skilled in the art may set according to requirements, where the first feature data is authenticated by means of the whitelist/blacklist library. When no matching feature data exists in the whitelist/blacklist library, the annotated stranger library is used for authentication. The first feature data may also be authenticated by means of the annotated stranger library. When no matching feature data exists in the annotated stranger library, the whitelist/blacklist library is used for authentication, or the whitelist/blacklist library and the annotated stranger library may be simultaneously used for authentication. That is, the embodiments of the present disclosure do not specifically limit the time sequence of performing the authentication operation using two libraries, as long as the authentication can be performed, it can be used as the embodiments of the present disclosure.

In addition, in the embodiments of the present disclosure, when no feature data matching the first feature data of the first image exists in the target library (that is, no matching feature data exists in the annotated stranger library and the whitelist/blacklist library). In this case, it can be determined that the first authentication result is authentication failure, and the first image may be saved. For example, when the feature data of all objects in the target library does not match the first feature data of the first image, the first image may be saved. Moreover, in response to the case that the first authentication result is authentication failure, joint authentication may be performed based on the second image obtained by the second camera module other than the first camera module and the first image, and the identity of the to-be-authenticated object is determined according to the second authentication result of the joint authentication.

The process of the first authentication operation on the second image in the embodiments of the present disclosure is the same as that of the first image, and the first authentication result of the second image may also be obtained. No repeated descriptions are provided in the present disclosure.

In the case that no object matching the first feature data exists in the target library, the first image may be temporarily stored. In addition, in order to reduce the redundancy of the image and the storage space occupied by the temporarily stored first image, deduplication processing is performed on the first image within a preset time range, thereby reducing excessive temporary storage of images for the same to-be-authenticated object. In the embodiments of the present disclosure, deduplication processing is performed on the first image and/or the second image that fails in authentication within a first time range, to obtain the first image and/or the second image that satisfies a first preset condition for each to-be-authenticated object within the first time range. The first time range may be an adjustable rolling window. For example, it may be set to 2-5 seconds. Batch processing is performed on the first image and the second image waiting to be archived (temporarily stored) according to the first time range. In this case, merging and deduplication processing are performed on the first images of the same to-be-authenticated object, and merging and deduplication processing are performed on the second images of the same to-be-authenticated object. Since the first images of different to-be-authenticated objects may be obtained within the first time range, the temporarily stored first images may also be images of different to-be-authenticated objects, or multiple images of one to-be-authenticated object. In this case, the images of the same to-be-authenticated object in the first image may be recognized, e.g., compared according to the feature data of each image. An image with the similarity greater than a similarity threshold is determined as an image of the same to-be-authenticated object, and further, only one image may be retained in each image of the same to-be-authenticated object according to the first preset condition. The first preset condition may be that the first temporarily stored image is retained according to the temporary storage time, and the remaining temporarily stored images of the same to-be-authenticated object are deleted. Alternatively, the first preset condition may also be: comparing the score values of the images for the same to-be-authenticated object, retaining the image with the highest score value, and deleting the remaining images. The obtaining of the score value is the same as the foregoing embodiment. For example, the image may be analyzed according to a preset algorithm to obtain a score value, or the image may be scored by using the neural network. The principle of scoring is determined based on the image resolution, the angle of the face, and the occlusion situation. A person skilled in the art may select a corresponding scoring method according to requirements, which is not specifically limited in the present disclosure.

In this way, the suspicious persons in the first image captured by the first camera module within the first time range (the first object and the second object are not matched) may be obtained, and only one first image is retained for each to-be-authenticated object, thereby reducing the use of storage space. The foregoing merely describes the processing of the first image of the first camera module by using the example of the first camera module, and the processing modes of the remaining camera modules are the same, and the description is not repeated here.

Figure 5:
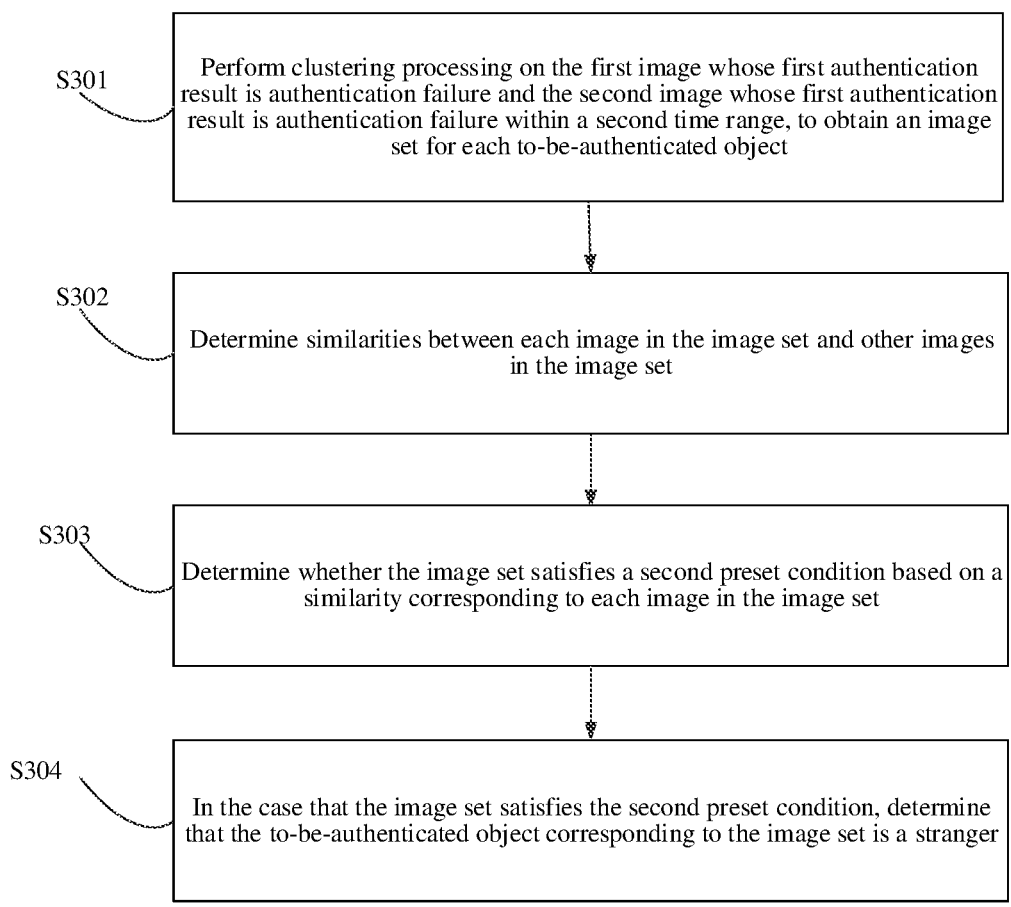
FIG. 5 is a flowchart illustrating step S300 in an image processing method according to embodiments of the present disclosure.

After merging and deduplication processing is performed on the first images, the identity of the to-be-authenticated object may be determined by combining the second images captured by the remaining second camera modules. FIG. 5 is a flowchart illustrating step S300 in an image processing method according to embodiments of the present disclosure. In response to the case that the first authentication result is authentication failure, using the first image and the second image for joint authentication, and determining the identity of the to-be-authenticated object according to the second authentication result of the joint authentication includes the following steps.

At S301, clustering processing is performed on the first image whose first authentication result is authentication failure and the second image whose first authentication result is authentication failure within a second time range, to obtain an image set for each to-be-authenticated object.

The device that executes the image processing method according to the embodiments of the present disclosure may merge the first image and the second image of each camera module that do not match the feature data within the second time range, and perform clustering processing to obtain an image set of each to-be-authenticated object. The images included in each image set are images of the same to-be-authenticated object. This makes it easy to process each image set.

At S302, the similarity between each image in the image set and other images in the image set is determined.

In the embodiments of the present disclosure, similarity analysis is performed on the images of the image set of the same to-be-authenticated object, so as to determine the similarity between each image and other images, thereby further determining whether each image in the image set is an image of the same to-be-authenticated object.

At S303, whether the image set satisfies a second preset condition is determined based on the similarity corresponding to each image in the image set.

At S304, in the case that the image set satisfies the second preset condition, it is determined that the to-be-authenticated object corresponding to the image set is a stranger.

After obtaining the similarity between each image and other images in each image set, it can be determined whether the image set satisfies the second preset condition according to the obtained similarity value, and if the second preset condition is satisfied, the probability that the image set is an image of the same object is high. The image set may be retained. If it is determined that the similarities do not satisfy the second preset condition, it is determined that the clustering of each image in the image set is not credible, and the probability of the images being the same object is low, and the image set may be deleted in this case. Moreover, it may further determine whether the to-be-authenticated object is an unregistered object by using an image set that satisfies a preset condition.

Figure 6:
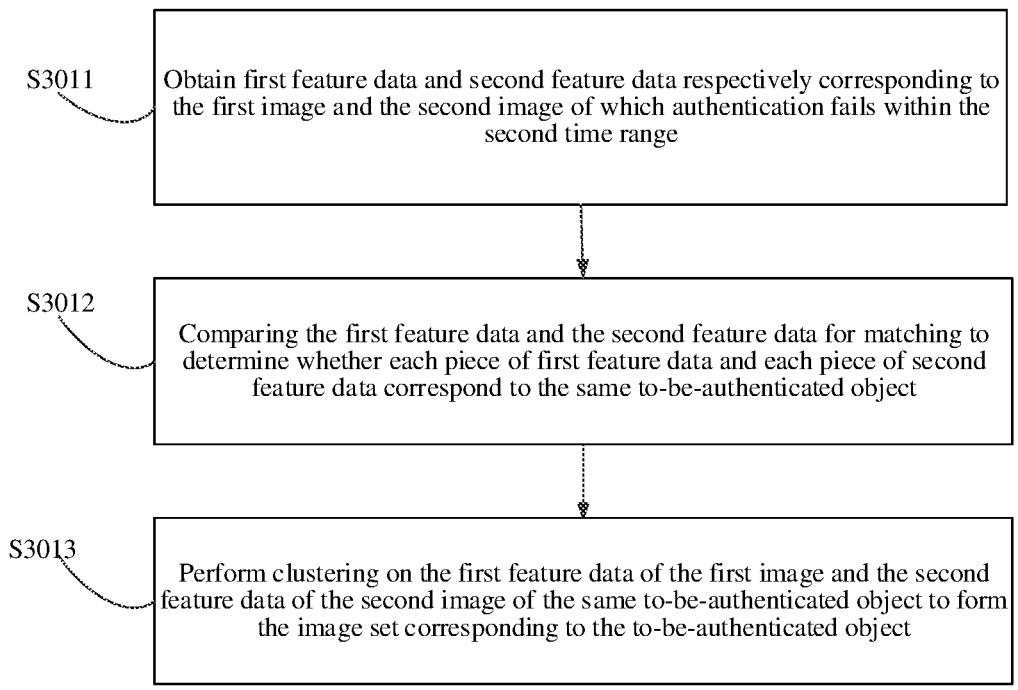
FIG. 6 is a flowchart illustrating step S301 in an image processing method according to embodiments of the present disclosure.

Each process is described in detail below. FIG. 6 is a flowchart illustrating step S301 in an image processing method according to embodiments of the present disclosure. Performing clustering processing on the first image whose first authentication result is authentication failure and the second image whose first authentication result is authentication failure within the second time range, to obtain the image set for each to-be-authenticated object includes the following steps.

At S3011, first feature data and second feature data respectively corresponding to the first image and the second image that fail in authentication within the second time range are obtained.

At S3012, comparative matching is performed on the first feature data and the second feature data to determine whether each piece of first feature data and each piece of second feature data correspond to the same to-be-authenticated object.

At S3013, clustering is performed on the first feature data of the first image and the second feature data of the second image of the same to-be-authenticated object to form the image set corresponding to the to-be-authenticated object.

In step S3011, the second time range is a time range greater than the first time range. For example, the first time range may be 2-5 s and the second time range may be 10 min, which is not a specific limitation of the embodiments of the present disclosure. By limiting the second time range to be greater than the first time range, the first image and the second image that fail in authentication and are obtained by means of the deduplication processing in each first time range are obtained, and different images of different to-be-authenticated objects are obtained by using the first image and the second image obtained by each camera module in the second time range. For example, the first camera module and at least one second camera module obtained in the second time range may be used to deduplicate the first image and the second image obtained in each first time range, and duplicate features of the object to-be-authenticated object are selected and merged. For example, images with facial features greater than the similarity threshold are merged into one category, that is, the images are used as an image of the to-be-authenticated object. By means of the step, image sets for multiple to-be-authenticated objects are obtained, and each image set contains images of the same to-be-authenticated object.

It should be noted here that each processed image in the embodiments of the present disclosure may include identification information of a camera module associated therewith, so as to determine which camera module each image is captured by, and correspondingly obtain the position of the to-be-authenticated object. In addition, the image is also associated with the time information of the camera module capturing the image, so that the time when each image is captured can be determined, and the time when the to-be-authenticated object is located at each position is determined correspondingly.

When clustering is performed on each image, the first feature data of the first image that fails in authentication in the second time range and the second feature data of the second image that fails in authentication are obtained first, where the feature data of each image is recognized by means of the neural network, which is not specifically limited in the present disclosure. After the first feature data and the second feature data are obtained, comparative matching is performed on the first feature data and the second feature data to determine whether each of the first feature data and the second feature data corresponds to the same to-be-authenticated object, and the feature data corresponding to the same to-be-authenticated object is combined into one category to form an image set for each to-be-authenticated object. The image set may include each image and the feature data corresponding to each image, or may only include the feature data of each image, which is not specifically limited in the present disclosure. The method for determining whether each feature data corresponds to the same to-be-authenticated object may include: determining by using a neural network. If the probability of the two pieces of recognized feature data being the same to-be-authenticated object is higher than a preset threshold, it is determined that the two pieces of feature data are the same to-be-authenticated object, and if the probability is lower than the preset threshold, it is determined as a different to-be-authenticated object. In this way, it is determined whether each feature data is the feature data of the same to-be-authenticated object, and the image sets corresponding to different to-be-authenticated objects are further determined.

Figure 7:
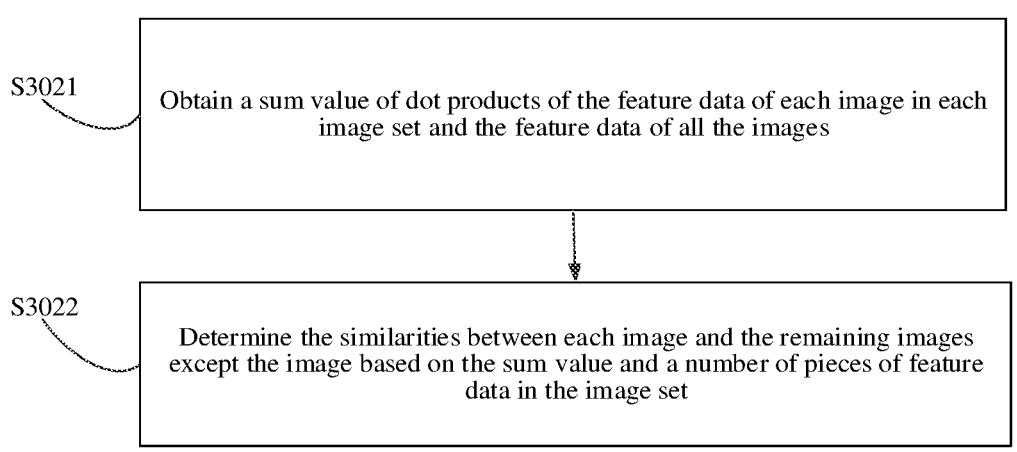
FIG. 7 is a flowchart illustrating step S302 in an image processing method according to embodiments of the present disclosure.

After obtaining the image set for each to-be-authenticated object, the similarity between the images in each image set is determined. FIG. 7 is a flowchart illustrating step S302 in an image processing method according to embodiments of the present disclosure. Determining the similarity between each image in the image set and other images in the image set includes the following steps.

At S3021, a sum value of the dot product of the feature data of each image in each image set and the feature data of all the images is obtained.

By means of step S200, feature data for each image in the image set, such as the first feature data, is obtained in the form of a feature vector. On this basis, dot product operation and summing processing are performed on the feature data of each image in the image set and the feature data of all the images. For example, an image set may include n images, where n is an integer greater than 1, and the sum values between facial feature data between each image and all images are obtained correspondingly. For example, the sum value of the i-th image may be $S_i = N_i \cdot N_1 + N_i \cdot N_2 + \ldots N_i \cdot N_n$, where $N_i$ is the facial feature data of the i-th image. In the foregoing manner, the sum value of the dot product of the facial feature data of each image and the facial feature data of all the images is obtained.

It should be noted here that the feature data of each image obtained in the embodiments of the present disclosure is a feature vector of normalization processing, that is, the first feature data of each first image and the second feature data of the second image obtained by the embodiments of the present disclosure are feature vectors with the same dimensions and the same length, so that it is convenient to operate each feature data.

At S3022, the similarity between each image and the remaining images is determined based on the sum value and the number of pieces of feature data in the image set.

After each sum value is obtained, the similarity between each image and other images is determined according to the number of images in the image set. In the embodiments of the present disclosure, the similarity may be $$P_i = \frac{S_i}{n-1} = \frac{N_i \cdot N_1 + N_i \cdot N_2 + \ldots N_i \cdot N_n}{n-1}.$$

That is, the obtained sum value may be n−1, that is, the similarity between each image and the other images is obtained.

After obtaining the similarity between each image and the other images, it is determined whether the image set satisfies a preset condition according to the obtained similarity values. Moreover, the image set that satisfies the preset condition is used to determine whether the corresponding to-be-authenticated object is an unregistered person.

In some possible implementations, in the case of determining that the image set satisfies the preset condition based on the similarity between the images, before determining whether the to-be-authenticated object is a stranger based on the image set, whether the image set satisfies the second preset condition may also be further determined, and if the similarity corresponding to each image in the image set satisfies any of the following conditions, it is determined that the image set satisfies the second preset condition.

a) The maximum similarity among the similarities corresponding to the images in the image set is greater than a first similarity threshold.

In the embodiments of the present disclosure, the maximum similarity among the similarities to the other images is compared with the first similarity threshold. If the maximum similarity is greater than the first similarity threshold, it is indicated that the similarity between the images in the image set is high, and it is determined that the image set satisfies the preset condition. If the maximum similarity is less than the first similarity threshold, it is indicated that the clustering effect of the image set is unsatisfactory, and the probability that the images in the image set are different to-be-authenticated objects is high, and in this case, the image set may be deleted.

b) The amount of images with the similarity among the similarities between the images in the image set greater than a second similarity threshold exceeds a preset ratio.

Similarly, if the ratio of the similarity among the similarities between the images in the image set greater than the second similarity threshold is greater than the preset ratio, e.g., if 50% of the images have similarities greater than the second similarity threshold, then it is determined that the similarity between the images in the image set is high, and it is determined that the image set satisfies the preset condition. If the ratio of images greater than the second similarity threshold is less than the preset ratio, it is indicated that the clustering effect of the image set is unsatisfactory, and the probability that the images in the image set are different to-be-authenticated objects is high, and in this case, the image set may be deleted.

c) The minimum similarity among the similarities between the images in the image set is greater than a third similarity threshold.

Similarly, if the smallest similarity in the image set is greater than the third similarity threshold, it is indicated that the similarity between the images in the image set is high, and it is determined that the image set satisfies the preset condition. If the minimum similarity is less than the first similarity threshold, it is indicated that the clustering effect of the image set is unsatisfactory, and the probability that the images in the image set are different to-be-authenticated objects is high, and in this case, the image set may be deleted. The selection of the first similarity threshold, the second similarity threshold, and the third similarity threshold may be set according to different requirements, which is not specifically limited in the present disclosure.

In this way, it can be determined whether the image set satisfies the preset condition, and the identity determination of the to-be-authenticated object is further performed by using the image set that satisfies the preset condition. In the case that the similarity between the images in the image set satisfies the preset condition, determining whether the to-be-authenticated object is a stranger may include: in the case that the images in the image set are images captured by different camera modules within different time ranges, determining that the to-be-authenticated object is the stranger.

That is, if the image set includes two images, where the two images are obtained by the first camera module and the second camera module, respectively, and the capture time is in different time ranges, in this case, the to-be-authenticated object corresponding to the image set is determined as a stranger. That is, the identity of the to-be-authenticated object is not recognized in the first image captured by the first camera module, and the identity of the to-be-authenticated object is not recognized in the second image captured by the second camera module. The time when the first image is captured and the time when the second image is captured are in different time ranges, for example, in different first time ranges, in the case that the image set composed of the first image and the second image satisfies the preset condition, it is determined that the to-be-authenticated object corresponding to the image set is a stranger, that is, a strange person.

In this way, joint determination is performed on the identity of the suspicious person by means of the images captured by multiple camera modules, so that the identity of the to-be-authenticated object can be determined more accurately.

In the case that it is determined that the to-be-authenticated object corresponding to the first image is a stranger, a preset prompt operation is performed. As described in the foregoing embodiments, the information of the stranger may be prompted to relevant persons by means of audio or display output. That is, in the embodiments of the present disclosure, when the to-be-authenticated object corresponding to the first image is the stranger, performing the preset prompt operation includes: displaying an image of the stranger, the current position information of the stranger, and statistical information of the number of occurrences in a display device; and/or prompting the presence of the stranger, the current position information of the stranger, and statistical information of the number of occurrences by means of an audio prompt. The staying time is determined based on the time when it is detected that the object is annotated as a stranger. For example, the time difference between the first time when the object is annotated as a stranger the last time and the time when the object is annotated as a stranger the first time is used as the staying time, and the frequency of occurrence may be a ratio of the number of times the stranger is recognized to the foregoing staying time. In other embodiments of the present disclosure, other information may also be counted, such as the position information of the stranger. The position of the stranger may be determined according to the identifier or position of the camera module that captures the image of the stranger, so that the moving trajectory of the stranger may be obtained, and the present disclosure does not list the statistical information one by one. In the embodiments of the present disclosure, the foregoing information is transmitted to the user interaction interface of the electronic device, and displayed by means of the user interaction interface, so as to conveniently view different pieces of prompt information.

In addition, in the case that it is determined that the to-be-authenticated object corresponding to the image set is the stranger, the image set is stored in an annotated stranger library, and the capture time and capture position of each image as well as the identifier of the camera module capturing the images are also stored in association.

In some other possible embodiments, when it is determined that the to-be-authenticated object is the annotated stranger, the number of times that the object is annotated as the stranger may be output; or the second authentication result may be output. The second authentication result is a result confirmed after joint determination of the to-be-authenticated objects, such as information that the object is recognized as the stranger or that the object cannot be recognized.

Figure 8:
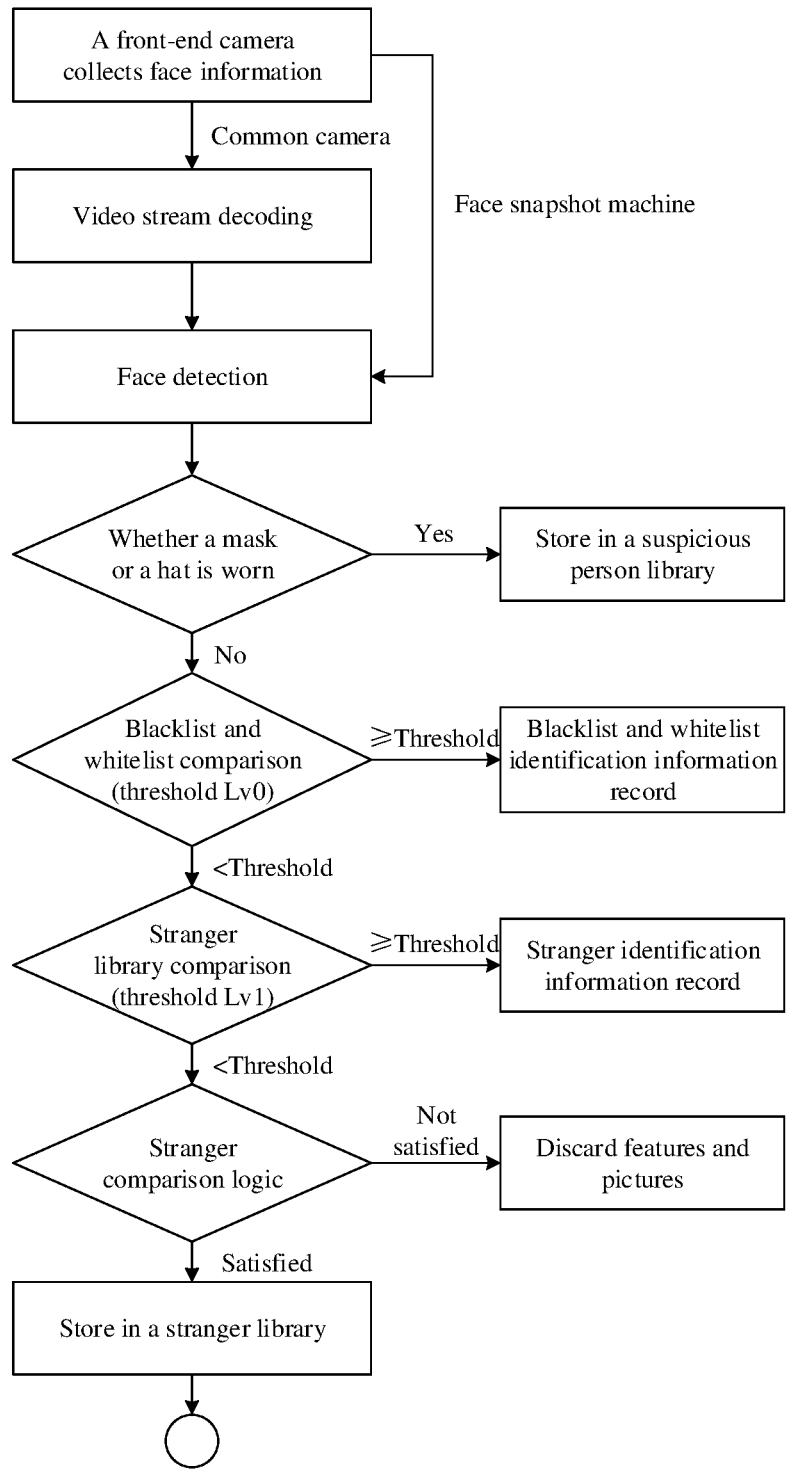
FIG. 8 is a flowchart illustrating an image processing method according to embodiments of the present disclosure.
Figure 9:
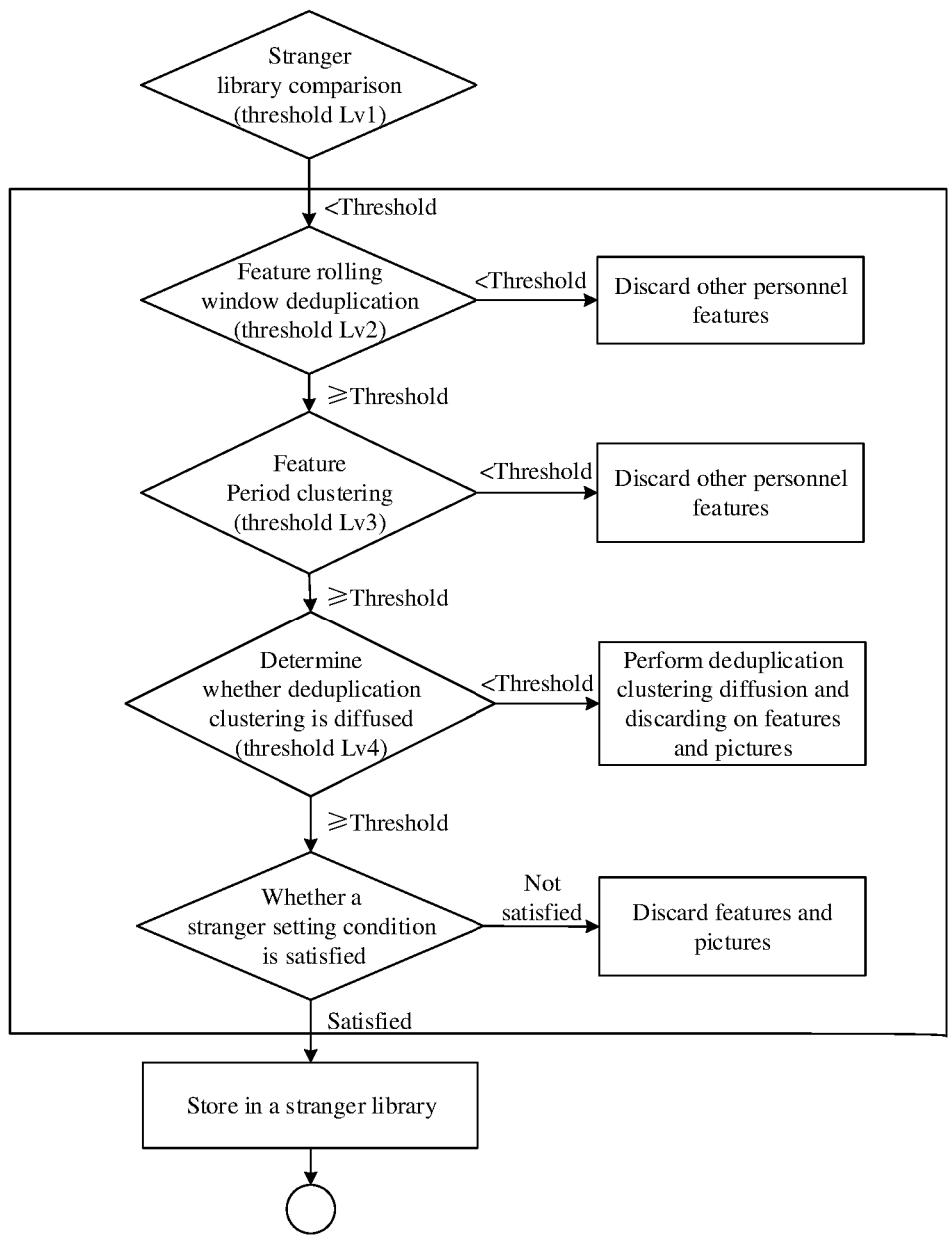
FIG. 9 is a flowchart illustrating stranger comparison in an image processing method according to embodiments of the present disclosure.

In order to describe the embodiments of the present disclosure in more detail, specific processes of the embodiments of the present disclosure are described below by way of example. FIG. 8 is a flowchart illustrating an image processing method according to embodiments of the present disclosure. FIG. 9 is a flowchart illustrating stranger comparison in an image processing method according to embodiments of the present disclosure.

The whitelist/blacklist personnel information is first entered into the system to form a whitelist/blacklist library. The first objects in the whitelist/blacklist library is collectively referred to as a person in the library, and a person not in the library is a stranger. Object information that is annotated as the stranger constitutes the annotated stranger library, and the above two libraries form a target library. The method for obtaining the images captured by the camera module may include: capturing portrait information by using a front-end camera, where the high-definition network camera captures a video stream and sends same back to a back-end server, or may also capture facial pictures directly by means of a face snapshot machine to the server. When the server receives the video stream, the returned video stream is decoded, and the face pictures and feature values (facial features) are extracted by means of the face detection algorithm or neural network. For example, if the server receives the returned face picture, then the video stream decoding is skipped and the feature value of the face image is directly detected. Whether the face picture contains the characteristics of wearing a mask is also detected while performing face detection, and the pictures matching the characteristics of wearing a mask are directly stored in the suspicious person picture library. Moreover, the angle and quality score of the face pictures are jointly determined, and the face images that do not satisfy the quality requirements are discarded.

Then, the face feature value of the obtained face image is compared with the whitelist/blacklist library in the stranger recognition system, and if the first matching threshold (adjustable) is exceeded, it is considered that a blacklist object or whitelist object is matched. In this case, the face image is stored in the comparison record of the whitelist/blacklist library. When the features in the white/black list library are not matched, the features are compared with the annotated stranger library. When the second matching threshold (adjustable) is exceeded, it is considered that the matching is successful and the stranger is recognized again.

If neither the whitelist/blacklist library nor the annotated stranger library is matched, the feature values of the face image are temporarily stored for processing. In this case, according to the setting of the first rolling window, for example, 2-5 seconds, batch processing is performed on the feature values waiting for archiving, and all features of the current rolling window are traversed. If the similarly is greater than a similarity threshold Lv2 (adjustable), it is considered that the same person is photographed multiple times in one scene. In this case, merging and deduplication are performed (for example, the earliest features that satisfy the requirements are retained), and the identifier of the photographing device is recorded.

Merging and clustering analysis are performed on the face images retained by different camera devices after multiple first time ranges. For example, the second time range may be the multiple first time ranges, and the second time range may be set to 10 min, and duplicate portrait features in the face images retained by different camera devices in the second time range are found and merged, where clustering is performed by using the similarity threshold Lv3 (adjustable), and the identifier of the photographing device corresponding to the image may be recorded. The original values of the face features at this step are not discarded and are merged and stored in one category.

After the foregoing two steps, the feature values with similarities exceeding Lv2 and Lv3 are grouped into the same category and considered as different picture features of the same person. For all the feature values of this person, i.e., N1, N2, N3, . . . Nk, the similarity between each feature value from 1 to k and the other feature values is calculated, i.e., $pi=(Ni*N1+Ni*N2+ \ldots +Ni*N(i-1)+Ni*N(i+1) \ldots Ni*Nk)/k-1$, and the maximum value is taken. If the maximum value is greater than or equal to the threshold Lv4 (adjustable, the Lv4 is greater than Lv3), it is considered that no diffusion occurs in the previous clustering, and the feature and the face picture corresponding to Ni are effectively retained as the to-be-displayed face picture. If the maximum value is less than the threshold Lv4, it is considered that the previous clustering is not credible, and all features and corresponding pictures are discarded.

For all the feature values of each category (that is, each different visitor) after authentication, the judgment is based on the following two conditions, i): whether it appears in n rolling windows, n is generally set to 1 or 2; and ii): whether the number of recorded devices is greater than m, m is generally set to 2; if both are satisfied, the condition for determining a stranger is satisfied, and it is inserted into the stranger library. That is, it is determined whether the images in the image set are photographed by different camera devices in different time ranges. If yes, the obtained image set that satisfies the stranger determination condition is added to the second database if the stranger determination condition is satisfied, otherwise, the image set is discarded.

All the saved feature values in the above steps have one-to-one correspondence to the original face pictures thereof, and all have time and address (device number) information. The system performs stranger picture query, map search, stranger trajectory query, situational statistics and other applications based on these information.

In conclusion, the embodiments of the present disclosure can determine the identity authority of the to-be-authenticated object based on the image information captured by multiple camera modules, which can effectively reduce the false alarm rate and greatly improve the accuracy of recognizing strangers. In addition, the embodiments of the present disclosure support direct recording of a person wearing a mask and a hat in a suspicious person list, and the time and place are recorded at the same time, which is convenient for later query. The service logic that an alarm is provided when a person who wears a mask appears is set according to requirements. Stranger information recording and statistics are supported: querying stranger pictures according to time and place, searching by maps, querying the trajectory, querying the staying time, the frequency of stranger appearances and other operations. That is, according to the embodiments of the present disclosure, the information of strangers in and out is effectively recorded, and the accuracy rate satisfies the requirements of practical applications, which solves the problem that strangers cannot be effectively recognized in public places. In practical applications, managers and security personnel are assisted in controlling strangers to enter and exit government buildings, enterprise parks, hotels, residence communities, office buildings and other closed places, and improve the safety and sense of order in the places.

A person skilled in the art can understand that, in the foregoing methods of the specific implementations, the order in which the steps are written does not imply a strict execution order which constitutes any limitation to the implementation process, and the specific order of executing the steps should be determined by functions and possible internal logics thereof.

It can be understood that the foregoing various method embodiments mentioned in the present disclosure may be combined with each other to form a combined embodiment without departing from the principle logic. Details are not described herein repeatedly due to space limitation.

In addition, the present disclosure further provides an image processing apparatus, an electronic device, a computer-readable storage medium, and a program, which can all be configured to implement any one of the image processing methods provided in the present disclosure. For corresponding technical solutions and descriptions, please refer to the corresponding content in the method section. Details are not described repeatedly.

Figure 10:
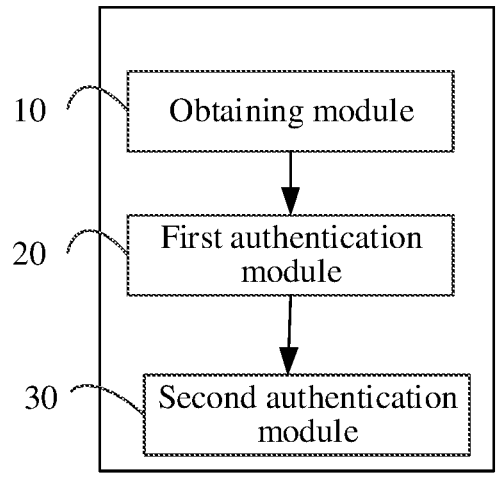
FIG. 10 shows a block diagram of an image processing apparatus according to embodiments of the present disclosure.

FIG. 10 shows a block diagram of an image processing apparatus according to embodiments of the present disclosure. As shown in FIG. 10, the image processing apparatus includes:

an obtaining module 10, configured to obtain a first image and a second image of a to-be-authenticated object, where the first image is captured by a first camera module, and the second image is captured by at least one second camera module;

a first authentication module 20, configured to compare the first image with image data in a target library for identity authentication, to obtain a first authentication result; and a second authentication module 30, configured to use, in response to the case that the first authentication result is authentication failure, the first image and the second image for joint authentication, and determine the identity of the to-be-authenticated object according to a second authentication result of the joint authentication.

In some possible implementations, the target library includes a whitelist/blacklist library.

The first authentication module is further configured to compare first feature data of the first image with feature data of each image in the whitelist/blacklist library; and in the case that the feature data matching the first feature data exists in the whitelist/blacklist library, determine that the first authentication result is authentication success, and determine the to-be-authenticated object corresponding to the first image as a blacklist or whitelist object.

In some possible implementations, the target library includes an annotated stranger library.

The first authentication module is further configured to compare the first feature data of the obtained first image with feature data of an image in the annotated stranger library; and in the case that the feature data matching the first feature data exists in the annotated stranger library, determine that the first authentication result is authentication success, and determine the to-be-authenticated object corresponding to the first image as an annotated stranger.

In some possible implementations, the apparatus further includes a statistics module, configured to collect, in the case that the feature data matching the first feature data exists in the annotated stranger library, statistics about the number of times that the to-be-authenticated object corresponding to the first image is annotated as a stranger.

In some possible implementations, the first authentication module is further configured to add, in the case that the first authentication result is authentication success, the first image and associated information thereof to a matching record corresponding to the matched feature data, where the associated information of the first image includes at least one of time information when the first camera module captures the first image, identification information of the first camera module, or position information of the first camera module.

In some possible implementations, the apparatus further includes a deduplication module, configured to perform, before using the first image and the second image for joint authentication, deduplication processing on the first image and/or the second image that fails in authentication within a first time range, to obtain the first image and/or the second image that satisfies a first preset condition for each to-be-authenticated object within the first time range.

In some possible implementations, the second authentication module is further configured to perform clustering processing on the first image whose first authentication result is authentication failure and the second image whose first authentication result is authentication failure within the second time range, to obtain the image set for each to-be-authenticated object;

determine the similarity between each image in the image set and other images in the image set;

determine whether the image set satisfies a second preset condition based on the similarity corresponding to each image in the image set; and in the case that the image set satisfies the second preset condition, determine that the to-be-authenticated object corresponding to the image set is a stranger.

In some possible implementations, the second authentication module is further configured to obtain a sum value of the dot product of the feature data of each image in each image set and the feature data of all the images; and determine the similarity between each image and the remaining images based on the sum value and the number of pieces of feature data in the image set.

In some possible implementations, the second authentication module is further configured to obtain first feature data and second feature data respectively corresponding to the first image and the second image that fail in authentication within the second time range;

perform comparative matching on the first feature data and the second feature data to determine whether each piece of first feature data and each piece of second feature data correspond to the same to-be-authenticated object; and perform clustering on the first feature data and the second feature data of the same to-be-authenticated object to form the image set of the same to-be-authenticated object.

In some possible implementations, the second authentication module is further configured to determine whether the image set satisfies the second preset condition based on the similarity corresponding to each image in the image set by means of at least one of the following modes:

the maximum similarity among the similarities corresponding to the images in the image set is greater than a first similarity threshold;

the amount of feature data with the similarity among the similarities corresponding to the images in the image set greater than a second similarity threshold exceeds a preset ratio; or the minimum similarity among the similarities corresponding to the images in the image set is greater than a third similarity threshold.

In some possible implementations, the second authentication module is further configured to delete, in the case that the similarity between the images in the image set does not satisfy the preset condition, all images corresponding to the image set.

In some possible implementations, the second authentication module is further configured to determine, in the case that the images corresponding to the feature data in the feature data set are images captured by different camera modules in different time ranges, the to-be-authenticated object corresponding to the feature data set to be the stranger.

In some possible implementations, the obtaining module is further configured to respectively obtain a first video captured by the first camera module and a second video captured by at least one second camera module, and preprocess the first video to obtain a third image and preprocess the second video to obtain a fourth image, or receive the third image and the fourth image; and determine an image that satisfies quality requirements in the third image as the first image, and determine an image that satisfies the quality requirements in the fourth image as the second image.

In some possible implementations, the obtaining module is further configured to detect, after obtaining the first image and the second image of the to-be-authenticated object, and before obtaining first feature data of the first image, and comparing the first feature data with feature data in the target library for identity authentication to obtain the first authentication result, whether the first image and/or the second image includes a predetermined feature; and in response to the case that the first image and/or the second image includes the predetermined feature, annotate the first image and/or the second image including the predetermined feature, where the predetermined feature includes at least one of a mask, a hat, or sunglasses.

In some possible implementations, the apparatus further includes a prompt module, configured to output and prompt the first authentication result or the second authentication result.

In some possible implementations, the prompt module is further configured to output, in response to the case that the first authentication result is authentication success, the identity of the to-be-authenticated object and associated information thereof in a preset mode, and if it is determined that the to-be-authenticated object is the annotated stranger, output the number of times that the to-be-authenticated object is annotated as the stranger; or output the second authentication result.

In some possible implementations, the second authentication module is further configured to store, in response to the case that the second authentication result is that the to-be-authenticated object is the stranger, the first image, the second image, and the associated information corresponding to the to-be-authenticated object in the target library, control the authentication result that the to-be-authenticated object is determined as the stranger, statistical information, and prompt information to be displayed by means of a user interaction interface.

In some embodiments, the functions provided by or the modules included in the apparatuses provided in the embodiments of the present disclosure may be used to implement the methods described in the foregoing method embodiments. For specific implementations, reference may be made to the description in the method embodiments above. For the purpose of brevity, details are not described herein repeatedly.

The embodiments of the present disclosure further provide a computer-readable storage medium, having computer program instructions stored thereon, where the computer program instructions, when being executed by a processor, enable the processor to implement the foregoing method. The computer-readable storage medium may be a non-volatile computer-readable storage medium.

The embodiments of the present disclosure further provide an electronic device, including: a processor; and a memory configured to store processor-executable instructions, where the processor is configured to execute the foregoing method.

The electronic device may be provided as a terminal, a server, or other forms of devices.

Figure 11:
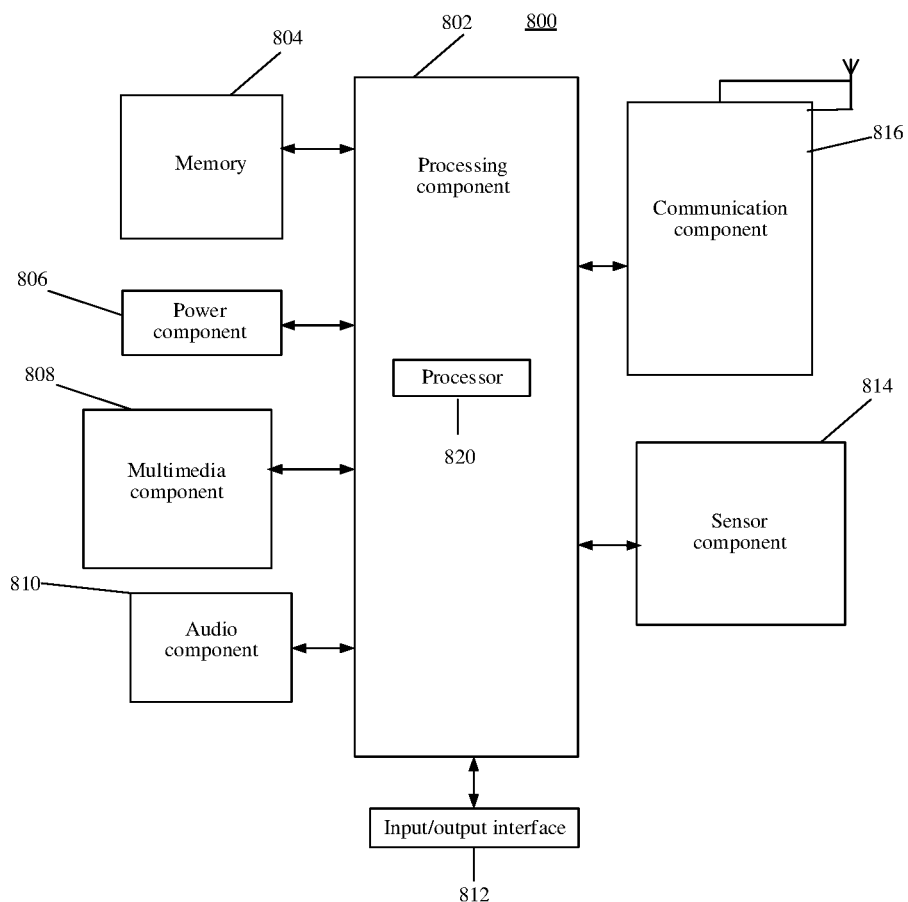
FIG. 11 shows a block diagram of an electronic device 800 according to embodiments of the present disclosure.

FIG. 11 is a block diagram of an electronic device 800 according to an exemplary embodiment. For example, the electronic device 800 may be a terminal such as a mobile phone, a computer, a digital broadcast terminal, a message transceiver device, a game console, a tablet device, a medical device, exercise equipment, and a personal digital assistant.

With reference to FIG. 11, the electronic device 800 may include one or more of the following components: a processing component 802, a memory 804, a power supply component 806, a multimedia component 808, an audio component 810, an Input/Output (I/O) interface 812, a sensor component 814, and a communication component 816.

The processing component 802 generally controls overall operation of the electronic device 800, such as operations associated with display, phone calls, data communications, camera operations, and recording operations. The processing component 802 may include one or more processors 820 to execute instructions to implement all or some of the steps of the method above. In addition, the processing component 802 may include one or more modules to facilitate interaction between the processing component 802 and other components. For example, the processing component 802 may include a multimedia module to facilitate interaction between the multimedia component 808 and the processing component 802.

The memory 804 is configured to store various types of data to support operations on the electronic device 800. Examples of the data include instructions for any application or method operated on the electronic device 800, contact data, contact list data, messages, pictures, videos, and the like. The memory 804 may be implemented by any type of volatile or non-volatile storage device, or a combination thereof, such as a Static Random-Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a disk or an optical disk.

The power supply component 806 provides power for various components of the electronic device 800. The power supply component 806 may include a power management system, one or more power supplies, and other components associated with power generation, management, and distribution for the electronic device 800.

The multimedia component 808 includes a screen between the electronic device 800 and a user that provides an output interface. In some embodiments, the screen may include a Liquid Crystal Display (LCD) and a Touch Panel (TP). If the screen includes a TP, the screen may be implemented as a touch screen to receive input signals from the user. The TP includes one or more touch sensors for sensing touches, swipes, and gestures on the TP. The touch sensor may not only sense the boundary of a touch or swipe action, but also detect the duration and pressure related to the touch or swipe operation. In some embodiments, the multimedia component 808 includes a front-facing camera and/or a rear-facing camera. When the electronic device 800 is in an operation mode, for example, a photography mode or a video mode, the front-facing camera and/or the rear-facing camera may receive external multimedia data. Each of the front-facing camera and the rear-facing camera may be a fixed optical lens system, or have focal length and optical zoom capabilities.

The audio component 810 is configured to output and/or input an audio signal. For example, the audio component 810 includes a Microphone (MIC), and the microphone is configured to receive an external audio signal when the electronic device 800 is in an operation mode, such as a calling mode, a recording mode, and a voice recognition mode. The received audio signal may be further stored in the memory 804 or transmitted by means of the communication component 816. In some embodiments, the audio component 810 further includes a speaker for outputting the audio signal.

The I/O interface 812 provides an interface between the processing component 802 and a peripheral interface module, which may be a keyboard, a click wheel, a button, etc. The button may include, but is not limited to, a home button, a volume button, a start button, and a lock button.

The sensor component 814 includes one or more sensors for providing state assessment in various aspects for the electronic device 800. For example, the sensor component 814 may detect an on/off state of the electronic device 800, and relative positioning of components, which are the display and keypad of the electronic device 800, for example, and the sensor component 814 may further detect the position change of the electronic device 800 or a component of the electronic device 800, the presence or absence of contact of the user with the electronic device 800, the orientation or acceleration/deceleration of the electronic device 800, and a temperature change of the electronic device 800. The sensor component 814 may include a proximity sensor, which is configured to detect the presence of a nearby object when there is no physical contact. The sensor component 814 may further include a light sensor, such as a CMOS or CCD image sensor, for use in an imaging application. In some embodiments, the sensor component 814 may further include an acceleration sensor, a gyroscope sensor, a magnetic sensor, a pressure sensor, or a temperature sensor.

The communication component 816 is configured to facilitate wired or wireless communications between the electronic device 800 and other devices. The electronic device 800 may access a wireless network based on a communication standard, such as WiFi, 2G, or 3G, or a combination thereof. In one exemplary embodiment, the communication component 816 receives a broadcast signal or broadcast-related information from an external broadcast management system by means of a broadcast channel. In one exemplary embodiment, the communication component 816 further includes a Near Field Communication (NFC) module to facilitate short-range communication. For example, the NFC module may be implemented based on Radio Frequency Identification (RFID) technology, Infrared Data Association (IrDA) technology, Ultra-Wideband (UWB) technology, Bluetooth (BT) technology, and other technologies.

In exemplary embodiments, the electronic device 800 may be implemented by one or more Application-Specific Integrated Circuits (ASICs), Digital Signal Processors (DSPs), Digital Signal Processing Devices (DSPDs), Programmable Logic Devices (PLDs), Field-Programmable Gate Arrays (FPGAs), controllers, microcontrollers, microprocessors, or other electronic elements, to execute the method above.

In exemplary embodiments, a non-volatile computer-readable storage medium is further provided, for example, a memory 804 including computer program instructions, which can executed by the processor 820 of the electronic device 800 to implement the method above.

Figure 12:
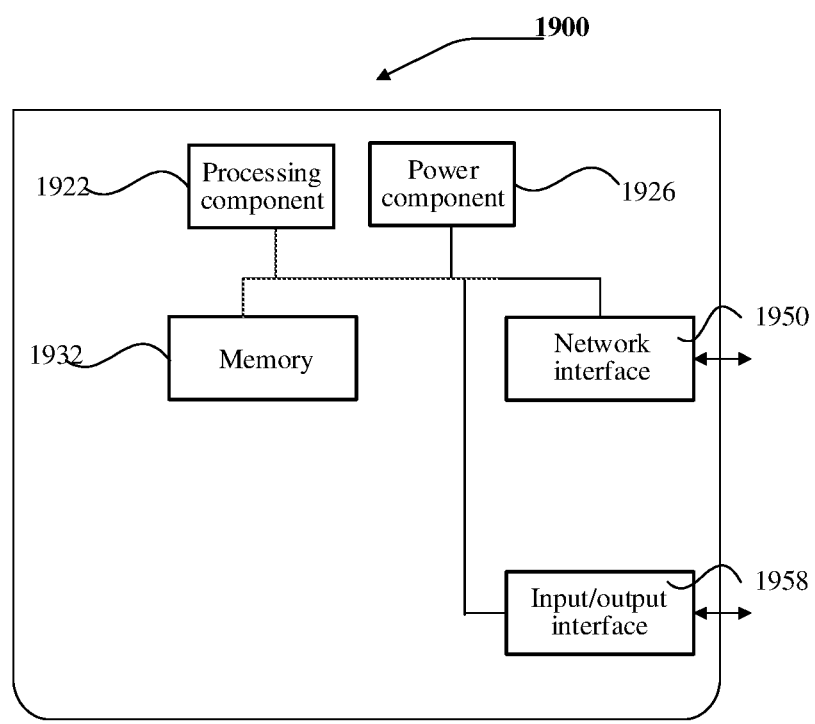
FIG. 12 shows a block diagram of an electronic device 1900 according to embodiments of the present disclosure.

FIG. 12 is a block diagram of an electronic device 1900 according to an exemplary embodiment. For example, the electronic device 1900 may be provided as a server. With reference to FIG. 12, the electronic device 1900 includes a processing component 1922 which further includes one or more processors, and a memory resource represented by a memory 1932 and configured to store instructions executable by the processing component 1922, for example, an application program. The application program stored in the memory 1932 may include one or more modules, each of which corresponds to a set of instructions. In addition, the processing component 1922 is configured to execute instructions so as to execute the method above.

The electronic device 1900 may further include a power supply component 1926 configured to execute power management of the electronic device 1900, a wired or wireless network interface 1950 configured to connect the electronic device 1900 to the network, and an I/O interface 1958. The electronic device 1900 may be operated based on an operating system stored in the memory 1932, such as Windows Server™, Mac OS X™, Unix™, Linux™, FreeBSD™ or the like.

In exemplary embodiments, a non-volatile computer-readable storage medium is further provided, for example, a memory 1932 including computer program instructions, which can be executed by the processing component 1922 of the electronic device 1900 to implement the method above.

The present disclosure may be a system, a method, and/or a computer program product. The computer program product may include a computer-readable storage medium, on which computer-readable program instructions used by the processor to implement various aspects of the present disclosure are stored.

The computer-readable storage medium may be a tangible device that can maintain and store instructions used by an instruction execution device. The computer-readable storage medium may be, but is not limited to, an electronic storage device, a magnetic storage device, an optical storage device, an electromagnetic storage device, a semiconductor storage device, or any suitable combination of the foregoing. More specific examples (a non-exhaustive list) of the computer-readable storage medium include a portable computer disk, a hard disk, a Random Access Memory (RAM), a Read-Only Memory (ROM), an Erasable Programmable Read-Only Memory (EPROM or flash memory), a Static Random Access Memory (SRAM), a portable Compact Disc Read-Only Memory (CD-ROM), a Digital Versatile Disk (DVD), a memory stick, a floppy disk, a mechanical coding device such as a punched card storing an instruction or a protrusion structure in a groove, and any appropriate combination thereof. The computer-readable storage medium used here is not interpreted as an instantaneous signal such as a radio wave or other freely propagated electromagnetic wave, an electromagnetic wave propagated by a waveguide or other transmission media (for example, an optical pulse transmitted by an optical fiber cable), or an electrical signal transmitted by a wire.

Computer-readable program instructions described herein can be downloaded to respective computing/processing devices from a computer-readable storage medium or to an external computer or external storage device via a network, for example, the Internet, a Local Area Network (LAN), a Wide Area Network (WAN) and/or a wireless network. The network may computer copper transmission cables, optical transmission fibers, wireless transmission, routers, firewalls, switches, gateway computers and/or edge servers. A network adapter card or a network interface in each computing/processing device receives the computer-readable program instruction from the network, and forwards the computer-readable program instruction, so that the computer-readable program instruction is stored in a computer-readable storage medium in each computing/processing device.

Computer program instructions for carrying out operations of the present disclosure may be assembler instructions, Instruction-Set-Architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions can be completely executed on a user computer, partially executed on a user computer, executed as an independent software package, executed partially on a user computer and partially on a remote computer, or completely executed on a remote computer or a server. In a scenario involving a remote computer, the remote computer may be connected to the user's computer through any type of network, including a LAN or a WAN, or the connection may be made to an external computer (for example, through the Internet using an Internet service provider). In some embodiments, an electronic circuit such as a programmable logic circuit, a Field Programmable Gate Array (FPGA), or a Programmable Logic Array (PLA) is personalized by using status information of the computer-readable program instructions, and the electronic circuit can execute the computer-readable program instructions to implement various aspects of the present disclosure.

Various aspects of the present disclosure are described here with reference to the flowcharts and/or block diagrams of the methods, apparatuses (systems), and computer program products according to the embodiments of the present disclosure. It should be understood that each block in the flowcharts and/or block diagrams and a combination of the blocks in the flowcharts and/or block diagrams can be implemented with the computer-readable program instructions.

These computer-readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium, and these instructions instruct a computer, a programmable data processing apparatus, and/or other devices to work in a specific manner. Therefore, the computer-readable storage medium having the instructions stored thereon includes a manufacture, and the manufacture includes instructions in various aspects for implementing the specified function/action in the one or more blocks in the flowcharts and/or block diagrams.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus or other device implement the functions/acts specified in one or more blocks of the flowcharts and/or block diagrams.

The flowcharts and block diagrams in the accompanying drawings show architectures, functions, and operations that may be implemented by the systems, methods, and computer program products in the embodiments of the present disclosure. In this regard, each block in the flowcharts or block diagrams may represent a module, a program segment, or a part of instruction, and the module, the program segment, or the part of instruction includes one or more executable instructions for implementing a specified logical function. In some alternative implementations, the functions noted in the block may also occur out of the order noted in the accompanying drawings. For example, two consecutive blocks are actually executed substantially in parallel, or are sometimes executed in a reverse order, depending on the involved functions. It should also be noted that each block of the block diagrams and/or flowcharts, and combinations of blocks in the block diagrams and/or flowcharts, can be implemented by special purpose hardware-based systems that perform the specified functions or acts or carried out by combinations of special purpose hardware and computer instructions.

The embodiments of the present disclosure are described above. The foregoing descriptions are exemplary but not exhaustive, and are not limited to the disclosed embodiments. Many modifications and variations will be apparent to a person of ordinary skill in the art without departing from the scope and spirit of the described embodiments. The terminology used herein was chosen to best explain the principles of the embodiments, the practical application or technical improvement over technologies found in the marketplace, or to enable other persons of ordinary skill in the art to understand the embodiments disclosed herein.

The invention claimed is:

1. An image processing method, comprising:
   obtaining a first image and a second image of a to-be-authenticated object, wherein the first image is captured by a first camera module, and the second image is captured by at least one second camera module;
   comparing the first image with image data in a target library for identity authentication, to obtain a first authentication result; and
   in response to the first authentication result being authentication failure, performing joint authentication on the first image and the second image, and determining an identity of the to-be-authenticated object according to a second authentication result of the joint authentication,
   wherein in response to the first authentication result being authentication failure, performing joint authentication on the first image and the second image, and determining the identity of the to-be-authenticated object according to the second authentication result of the joint authentication comprises:
      performing clustering processing on a first image whose first authentication result is authentication failure and a second image whose first authentication result is authentication failure within a second time range, to obtain an image set for each to-be-authenticated object;
      determining similarities between each of a plurality of images in the image set and other images in the image set;
      determining whether the image set satisfies a second preset condition based on a similarity corresponding to each image in the image set; and
      in response to determining that the image set satisfies the second preset condition, determining that the to-be-authenticated object corresponding to the image set is a stranger.

2. The method according to claim 1, wherein the target library comprises a whitelist and blacklist library;

comparing the first image with the image data in the target library for identity authentication, to obtain the first authentication result comprises:
  comparing first feature data of the first image with feature data of each image in the whitelist and blacklist library; and
  in the case that feature data matching the first feature data exists in the whitelist and blacklist library, determining that the first authentication result is authentication success, and determining a to-be-authenticated object corresponding to the first image as a blacklist or whitelist object.

3. The method according to claim 1, wherein the target library comprises an annotated stranger library;
  comparing the first image with the image data in the target library for identity authentication, to obtain the first authentication result comprises:
    comparing first feature data of the first image with feature data of an image in the annotated stranger library; and
    in the case that feature data matching the first feature data exists in the annotated stranger library, determining that the first authentication result is authentication success, and determining a to-be-authenticated object corresponding to the first image as an annotated stranger.

4. The method according to claim 3, wherein the method further comprises: in the case that the feature data matching the first feature data exists in the annotated stranger library,
  collecting statistics about a number of times that the to-be-authenticated object corresponding to the first image is annotated as a stranger.

5. The method according to claim 1, further comprising:
  in response to the first authentication result being authentication success, adding the first image and associated information of the first image to a matching record corresponding to matched feature data, wherein the associated information of the first image comprises at least one of: information of time when the first camera module captures the first image, identification information of the first camera module, or position information of the first camera module.

6. The method according to claim 1, wherein the method further comprises:
  before performing joint authentication on the first image and the second image,
    performing deduplication processing on at least one of the first image or the second image of which authentication fails within a first time range, to obtain at least one of a first image or a second image that satisfies a first preset condition for each to-be-authenticated object within the first time range.

7. The method according to claim 1, wherein determining the similarities between each of the plurality of images in the image set and other images in the image set comprises:
  obtaining a sum value of dot products of feature data of each of the plurality of images in each image set and feature data of all images; and
  determining the similarities between each of the plurality of images and remaining images except the image based on the sum value and a number of feature data in the image set.

8. The method according to claim 1, wherein performing clustering processing on the first image whose first authentication result is authentication failure and the second image whose first authentication result is authentication failure within the second time range, to obtain the image set for each to-be-authenticated object comprises:
  obtaining first feature data and second feature data respectively corresponding to the first image and the second image of which authentication fails within the second time range;
  comparing the first feature data and the second feature data for matching to determine whether each piece of first feature data and each piece of second feature data correspond to a same to-be-authenticated object; and
  performing clustering on the first feature data and the second feature data of the same to-be-authenticated object to form an image set of the same to-be-authenticated object.

9. The method according to claim 1, wherein determining whether the image set satisfies the second preset condition based on the similarity corresponding to each image in the image set comprises at least one of the following manners:
  a maximum similarity among the similarities corresponding to the plurality of images in the image set is greater than a first similarity threshold;
  an amount of feature data with a similarity among the similarities corresponding to the plurality of images in the image set greater than a second similarity threshold exceeds a preset ratio; or
  a minimum similarity among the similarities corresponding to the plurality of images in the image set is greater than a third similarity threshold.

10. The method according to claim 1, wherein in response to the first authentication result being authentication failure, performing joint authentication on the first image and the second image, and determining the identity of the to-be-authenticated object according to the second authentication result of the joint authentication further comprises:
  in the case that the similarities between the plurality of images in the image set does not satisfy a preset condition, deleting all images corresponding to the image set.

11. The method according to claim 1, wherein in response to determining that the image set satisfies the second preset condition, determining that the to-be-authenticated object corresponding to the image set is the stranger comprises:
  in the case that the images corresponding to feature data in the image set are images captured by different camera modules in different time ranges, determining the to-be-authenticated object corresponding to the feature data to be the stranger.

12. The method according to claim 1, wherein obtaining the first image and the second image of the to-be-authenticated object comprises:
  respectively obtaining a first video captured by the first camera module and a second video captured by the at least one second camera module, and preprocessing the first video to obtain a plurality of third images and preprocessing the second video to obtain a plurality of fourth images, or receiving the plurality of third images and the plurality of fourth images; and
  determining an image of the plurality of third images that satisfies quality requirements as the first image, and determining an image of the plurality of fourth images that satisfies the quality requirements as the second image.

13. The method according to claim 12, wherein the method further comprises:
  after obtaining the first image and the second image of the to-be-authenticated object, and before obtaining first feature data of the first image, and comparing the first feature data with feature data in the target library for identity authentication, to obtain the first authentication result, detecting whether at least one of the first image or the second image comprises a predetermined feature; and in response to at least one of the first image or the second image comprising the predetermined feature, annotating the at least one of the first image or the second image comprising the predetermined feature, wherein the predetermined feature comprises at least one of a mask, a hat, or sunglasses.

14. The method according to claim 1, further comprising:
outputting and prompting the first authentication result or the second authentication result.

15. The method according to claim 14, wherein outputting and prompting the first authentication result or the second authentication result comprises:

in response to the first authentication result being authentication success, outputting the identity of the to-be-authenticated object and associated information of the to-be-authenticated object in a preset manner, and in response to determining that the to-be-authenticated object is an annotated stranger, outputting a number of times that the to-be-authenticated object is annotated as a stranger; or outputting the second authentication result.

16. The method according to claim 1, further comprising:
in response to the second authentication result indicating that the to-be-authenticated object is the stranger, storing the first image, the second image, and associated information that correspond to the to-be-authenticated object in the target library; and displaying an authentication result that the to-be-authenticated object is determined as the stranger, statistical information, and prompt information through a user interaction interface.

17. An image processing apparatus, comprising:
a processor; and
a memory configured to store instructions executable by the processor;
wherein the processor is configured to:
obtain a first image and a second image of a to-be-authenticated object, wherein the first image is captured by a first camera module, and the second image is captured by at least one second camera module;
compare the first image with image data in a target library for identity authentication, to obtain a first authentication result; and
perform, in response to the first authentication result being authentication failure, joint authentication on the first image and the second image, and determine an identity of the to-be-authenticated object according to a second authentication result of the joint authentication,
wherein the processor is further configured to:
perform clustering processing on a first image whose first authentication result is authentication failure and a second image whose first authentication result is authentication failure within a second time range, to obtain an image set for each to-be-authenticated object;
determine similarities between each of a plurality of images in the image set and other images in the image set;
determine whether the image set satisfies a second preset condition based on a similarity corresponding to each image in the image set; and in response to determining that the image set satisfies the second preset condition, determine that the to-be-authenticated object corresponding to the image set is a stranger.

18. The apparatus according to claim 17, wherein the target library comprises a whitelist and blacklist library; and the processor is configured to:
compare first feature data of the first image with feature data of each image in the whitelist and blacklist library; and
in the case that feature data matching the first feature data exists in the whitelist and blacklist library, determine that the first authentication result is authentication success, and determine a to-be-authenticated object corresponding to the first image as a blacklist or whitelist object.

19. The apparatus according to claim 17, wherein determining the similarities between each of the plurality of images in the image set and other images in the image set comprises:
obtaining a sum value of dot products of feature data of each of the plurality of images in each image set and feature data of all images; and
determining the similarities between each of the plurality of images and remaining images except the image based on the sum value and a number of feature data in the image set.

20. A non-transitory computer-readable storage medium, having computer program instructions stored thereon, wherein the computer program instructions, when being executed by a processor, enable the processor to implement the following operations:
obtaining a first image and a second image of a to-be-authenticated object, wherein the first image is captured by a first camera module, and the second image is captured by at least one second camera module;
comparing the first image with image data in a target library for identity authentication, to obtain a first authentication result; and
in response to the first authentication result being authentication failure, performing joint authentication on the first image and the second image, and determining an identity of the to-be-authenticated object according to a second authentication result of the joint authentication,
wherein the operation of in response to the first authentication result being authentication failure, performing joint authentication on the first image and the second image, and determining the identity of the to-be-authenticated object according to the second authentication result of the joint authentication comprises:
performing clustering processing on a first image whose first authentication result is authentication failure and a second image whose first authentication result is authentication failure within a second time range, to obtain an image set for each to-be-authenticated object;
determining similarities between each of a plurality of images in the image set and other images in the image set;
determining whether the image set satisfies a second preset condition based on a similarity corresponding to each image in the image set; and
in response to determining that the image set satisfies the second preset condition, determining that the to-be-authenticated object corresponding to the image set is a stranger.

* * * * *